United States Patent
Jeong et al.

(10) Patent No.: US 6,628,717 B1
(45) Date of Patent: Sep. 30, 2003

(54) LOSSLESS CODING METHOD AND VIDEO COMPRESSION CODING DEVICE USING THE SAME

(75) Inventors: Je Chang Jeong, Seoul (KR); Hoon Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/433,024

(22) Filed: Nov. 3, 1999

(30) Foreign Application Priority Data

Nov. 4, 1998 (KR) ............................................. 98/47086

(51) Int. Cl.[7] .......................... H04N 7/12; H04N 11/02
(52) U.S. Cl. ................................................. 375/240.19
(58) Field of Search ............................... 348/398, 384, 348/390, 403, 405, 420, 400; 375/240.03, 246, 253, 240.23, 240.16, 240.18, 240.19

(56) References Cited

U.S. PATENT DOCUMENTS 5,657,085 A * 8/1997 Katto .......................... 348/398
6,055,017 A * 4/2000 Shen et al. ............. 375/240.11
6,272,180 B1 * 8/2001 Lei ......................... 375/240.16
6,298,165 B1 * 10/2001 Howard ...................... 382/245
2002/0034256 A1 * 3/2002 Talluri et al. ........... 375/240.27

* cited by examiner

Primary Examiner—Chris Kelley
Assistant Examiner—Behrooz Senfi
(74) Attorney, Agent, or Firm—Birch, Stewart, Kolasch & Birch, LLP

(57) ABSTRACT

Lossless coding method and a video compression coding method using the same, wherein a digital video data inclusive of motion picture or still picture is compared to a threshold value, data greater than the threshold value, data smaller than the threshold value, and positional information on the data are obtained, and the data are subjected to Golomb Rice Coding, to compression coding the video data. And, a process is repeated for at least one stage, in which data are classified through comparison to a threshold value such that the digital video data to be compressed is closest to a level to apply the Golomb Rice Coding, whereby improving compression transmission performance and efficiency while saving bits, and reducing complexity.

13 Claims, 5 Drawing Sheets

LOSSLESS CODING METHOD AND VIDEO COMPRESSION CODING DEVICE USING THE SAME

BACKGROUND OF THE INVENTION

1. Field of the Invention

The present invention relates to a lossless coding method and a video compression coding method using the same, and more particularly, to method and device for compressing and encoding a digital data by processing an input symbol suitable for, application of the Golomb Rice Coding thereto.

2. Background of the Related Art

There is the wavelet transform in one of transform methods for coding a video signal, which is means for disassembling a signal in time(space) domain into respective frequency components, that is similar to the Fourier Transform. The wavelet transform improves a locality of the time domain in a high frequency region and a locality of a frequency domain in a low frequency region.

FIG. 1 illustrates a structure of a sub-band region when, a video signal is wavelet transformed.

Referring to FIG. 1, it is well known that, as a result of subjecting a video signal to a wavelet transform, a sub-band region division structure becomes to have a low frequency region containing relatively more meaningful information on the video signal being concentrated to one side thereof and a high frequency region containing relatively less meaningful information on the video signal being concentrated to the other side thereof. That is, low frequency components of an original video is gathered to the most coarse band(F0) and fine high frequency components are gathered to bands (F1~F9) other than the coarse band. All the coefficients for given bands except the lowest frequency band have relations with coefficients for the next sub-band in a similar direction. For example, of the nine sub-band regions F1~F9 in the wavelet transformed sub-band regions shown FIG. 1, F1, F4 and F7 regions show horizontal edge components of the video signal, and F2, F5 and F8 regions show vertical edge components, and F3, F6 and F9 regions show diagonal components. Therefore, if the wavelet transformed respective sub-band regions are scanned in different paths (horizontal, vertical and diagonal) by using such a characteristic, a more effective video compression is available. That is, by scanning the F1, F4 and F7 regions which have horizontal edge components in a horizontal direction, the F2, F5 and F8 regions which have vertical edge components in a vertical direction, and the F3, F6 and F9 regions which have diagonal edge components in a diagonal direction, a better compression ratio can be obtained in an arithmetic coding conducted later owing to a statistical characteristic(a probability is increased, in which consecutive zero runs are occurred by scanning in a direction that shows the edge components).

As another transform method for coding a video signal, there is the DCT(Discrete Cosine Transform). That is, the DCT also transforms respective blocks of video from spatial domains into frequency domains, to remove correlation of data. To do this, a received frame is divided into block units, and subjected to two dimensional axial transformation. The data thus subjected to DCT has a tendency to gather to one side(low frequency band). Only data gathered thus is. quantized.

FIG. 2 illustrates an example of a related art video compression coder, which is an MPEG(Moving Picture Experts Group) compression coder based on the DCT.

Referring to FIG. 2, there is a DCT unit 101 for subjecting a input digital video signal or a signal difference between the input digital video signal and a motion compensated signal of a previous input digital video signal to DCT. There is a quantizing unit 102 for quantizing an output of the DCT unit 101, i.e., DCT coefficients under the control of a bit rate control unit 105 and providing to a VLC(Variable Length Coding) unit 103. The VLC unit 103 uses the Huffman Coding, which is a noiseless coding for approaching to an entropy of a source data, and the Run Length Coding in compressing the quantized DCT coefficients and providing as a video data stream(MPEG Video Bitstream) through a buffer 104. The quantized signal is subjected to inverse quantizing in an inverse quantizing unit 106 and IDCT in an IDCT unit, and provided to an adder 108. The adder 108 adds the data motion compensated in the motion compensating unit 110 to the data subjected to IDCT, and stores in a frame memory 109. The motion compensating unit 110 uses both the data stored in the frame memory 109 and the input digital video signal in producing a motion vector, and conducts a motion compensation using the same. The subtracter 111 calculates a difference between the motion compensated data and the input digital video signal and provides to the DCT unit 101. Thus, the MPEG compression coder conducts a compression coding of the input digital video signal meeting the MPEG standards. In this instance, the VLC unit 103 maps DCT coefficients to code words provided in advance using the Huffman Coding and the Run Length Coding. The Huffman Coding reversely compresses data by assigning the shorter code word as the data has the higher probability of occurrence, to make an average code length(data amount) the smaller, that is known as a method for providing a minimum average code length for information of a given probability distribution.

However, the related art for compression coding a digital data, such as the Huffman Coding, has a limitation in improving a compression performance while reducing a number of bits and lowering a complexity. Therefore, a technology is in need, in which a digital data including a video data is compression coded in a better performance while a number of bits and a complexity are reduced.

SUMMARY OF THE INVENTION

Accordingly, the present invention is directed to a lossless coding method and a video compression coding method using the same that substantially obviates one or more of the problems due to limitations and disadvantages of the related art.

An object of the present invention is to provide a lossless coding method in which an input symbol is subjected to a forward classification processes to a form application of the Golomb Rice Coding is easy, and to the Golomb Rice Coding.

Another object of the present invention is to provide a lossless coding method and a video compression coder, in which input symbols are sorted into data greater than a threshold value and data smaller than the threshold value, producing a binary mask value assigning a position value to the sorted data, and applying the Golomb Rice Coding to each of the sorted data, for compression coding of the video.

Other object of the present invention is to provide a lossless coding method and a video compression coder, in which a process for sorting a digital video data by comparing to a preset threshold value to a level closest to apply the Golomb Rice Coding thereto is repeated more than one stage, for compression coding of a motion picture or a still picture.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the lossless coding method includes the steps of(1) comparing input data which are objects of coding to a threshold value, to classify the input data into values greater than the threshold value and values smaller than the threshold value, and, on the same time, obtaining positional information on the respective classified values which represent positions in input data groups, and (2) coding the values greater than the threshold value, the values smaller than the threshold value, and the positional information.

The values greater than the threshold value, the values smaller than the threshold value, and the positional information are subjected to Golomb Rice Coding.

A process is repeated for a preset times, in which the values greater than the threshold value, the values smaller than the threshold value, and the positional information are compared to another threshold value, classified, and coded.

In other aspect of the present invention, there is provided a video compression coding device including transform means for transforming a video signal into frequency information, classifying means for comparing the video signal transformed into frequency information to a threshold value, to classify the video signal into values greater than the threshold value, values smaller than the threshold value, and positional information representing positions of the respective classified values in the input video signal, means for subjecting the values greater than the threshold value and values smaller than the threshold value to the Golomb Rice Coding among the values from the classifying means, and means for subjecting the positional information to VLC among values from the classifying means.

Paying attention to that the Golomb Rice Coding based on the Huffman Coding has a simple circuitry system, and is easy to coding and decoding, the present invention suggests to subject an input symbol to forward classification into a form easy to apply the Golomb Rice Coding thereto, and to subject the data processed thus to the Golomb Rice Coding.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of tho invention and together with the description serve to explain the principles of the invention.

In the drawings.

DETAILED DESCRIPTION OF THE PREFERRED EMBODIMENT

Figure 3:
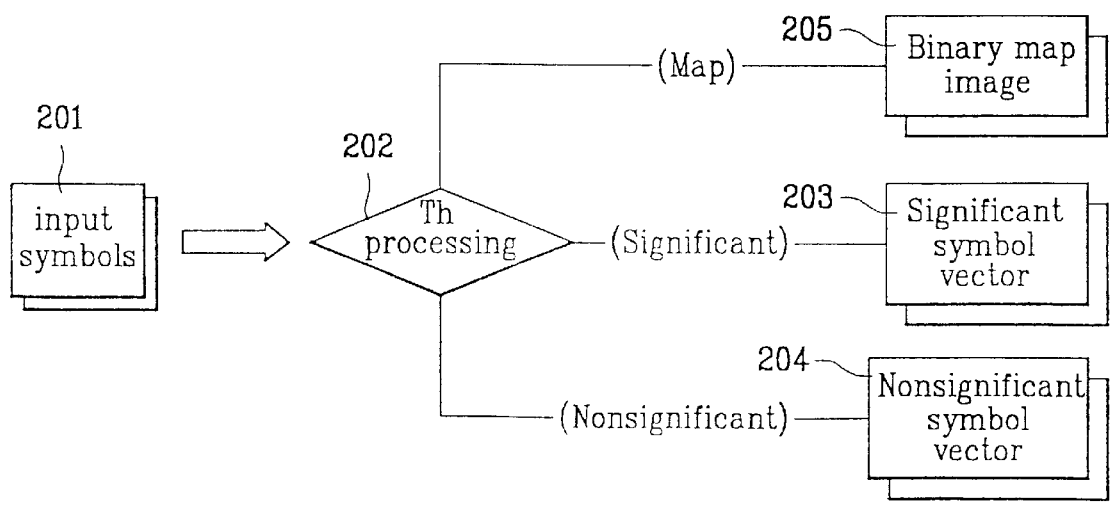
FIG. 3 illustrates a concept of a lossless coding in accordance with a preferred embodiment of the present invention.

Reference will now be made in detail to the preferred embodiments of the present invention, examples of which are illustrated in the accompanying drawings. FIG. 3 illustrates a concept of a lossless coding in accordance with a preferred embodiment of the present invention, showing the steps of comparing input symbols 201 to a preset threshold value Th 202, to obtain a group of symbols greater than the threshold value Tn(significant symbol vectors) 203, a group of symbols smaller than the threshold value Th(non significant symbol vectors) 204, and binary masks 205 which are positional information on symbols in respective groups (binary map image) Thus, in a case when the input symbols are sorted with reference to a preset threshold value, the binary masks, positional information, are produced, and the information is transmitted, an original data can be reproduced. And, if the binary mask values are subjected to VLC, a compressed data an be obtained, and if the sorted data is subjected to the Golomb Rice Coding an effective compression with a low complexity can be carried out. In such a process shown in FIG. 3, a process for comparing the sorted three data groups to another threshold values respectively and obtaining positional information according to a result of the comparison can be repeated for a preset times, for reaching to a stage at which the Golomb Rice Coding can be applied with easy by repeating the foregoing process until the data approaches closest to a an exponent of 2 probability distribution characteristic that the Golomb Rice Coding has.

Figure 1:
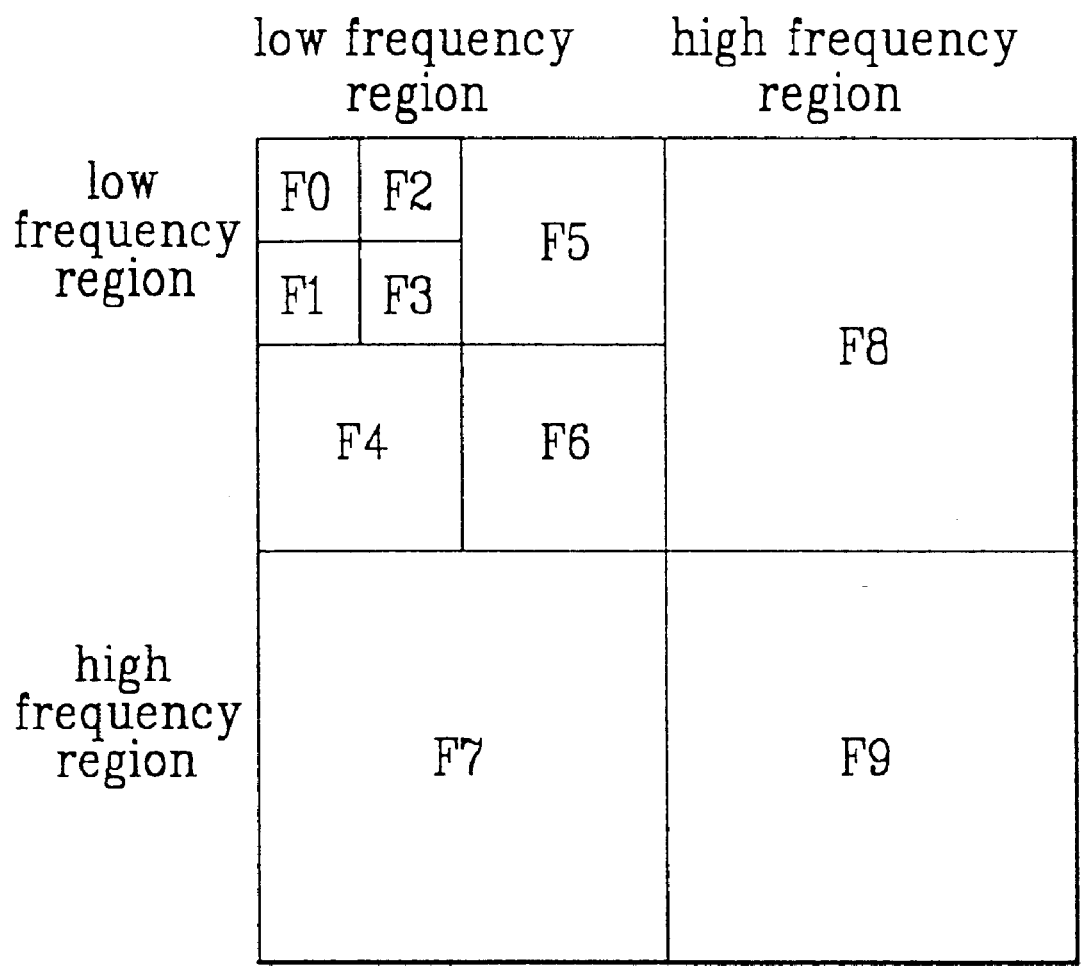
FIG. 1 illustrates a structure of a sub-band region when a video signal is wavelet transformed as an example of a related art method for coding a video signal.
Figure 2:
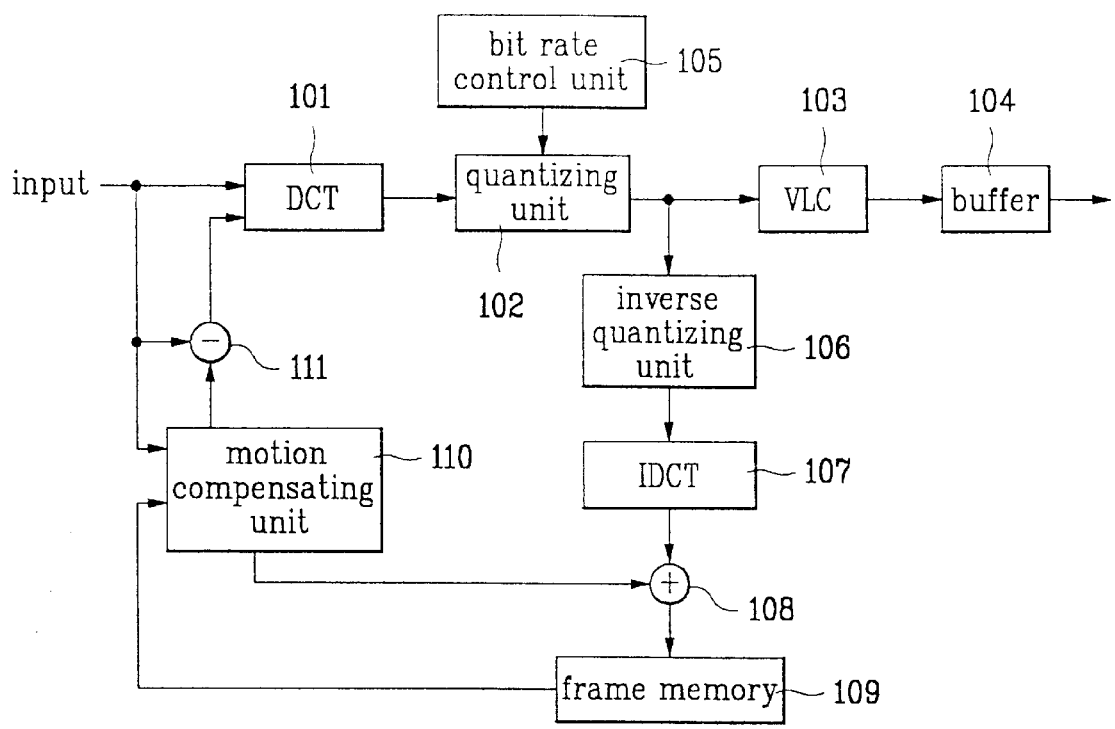
FIG. 2 illustrates a block diagram showing an example of a related art video coder.
Figure 4:
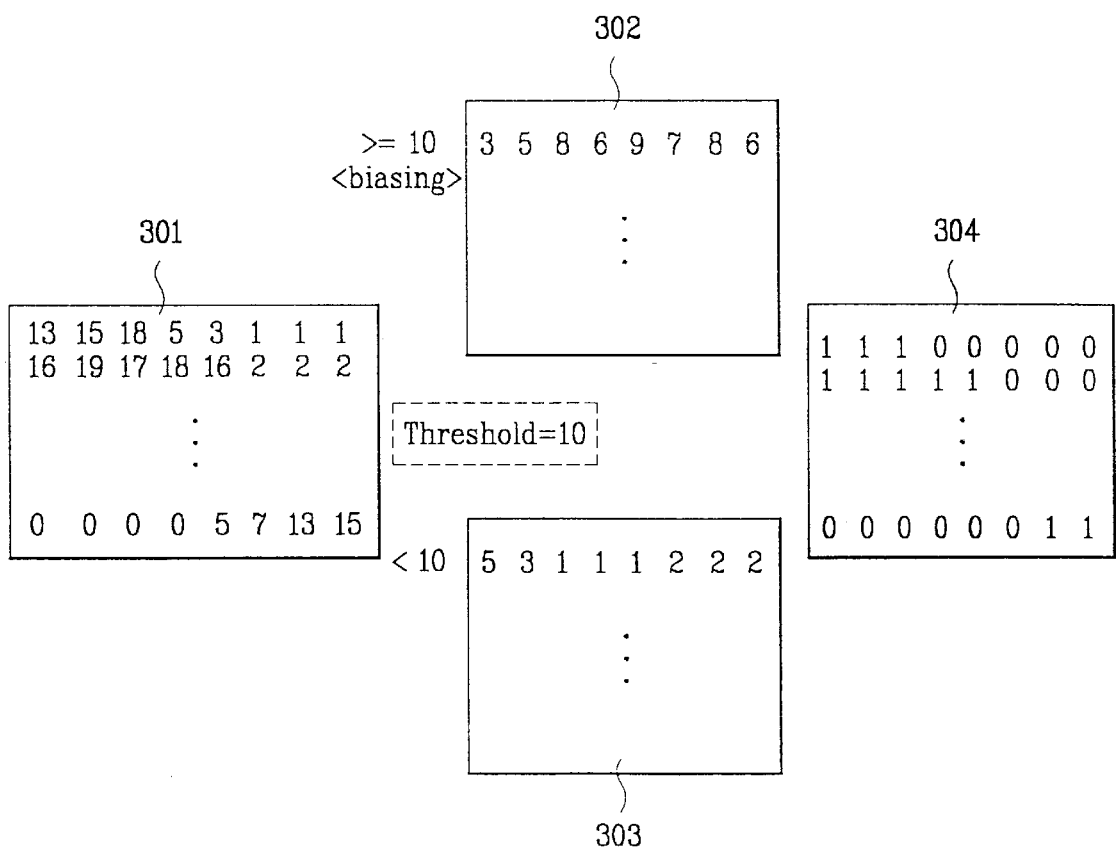
FIG. 4 illustrates an example of symbols of which values are sorted with reference a threshold value and binary masks are obtained according to a lossless coding method of the present invention.

FIG. 4 illustrates an example of a data group 302 greater than a threshold value Th=10, a data group 303 smaller than a threshold value Th=10, and information-binary masks 304 representing positions of data in respective data groups for the data 301 to be compressed being a data in F0 region in FIG. 1 having subjected to wavelet transform, with the threshold value Th set to be '10' in FIG. 3. That is, input symbols having values eater than Th(10) are biased [that is, input value−Th(10)=sorted value] and arranged [for image restoration, the data may be compensated as much as biased by Th(10)], and input symbols smaller than Th(10) is arranged as they are. In a case a value of the binary mask 304 is '1', it represents a position(a position of a relevant value in the input data 301 groups) of a value('13', '15', '18', '16', '19'. . . ) greater than the threshold value Th=10, and, in a case a value of the binary mask 304 is '0', it represents a position(a position of a relevant value in the input data 301 groups) of a value('5', '3', '1', '1', '1', . . . ) smaller than the threshold value Th=10. In this instance, a position of a value smaller than the threshold value may be represented with '1', and a position of a value greater than the threshold value may be represented with '0'. The coding method of the present invention is applicable regardless of the input digital data of being one dimensional data, or two dimensional data, or a data subjected to an appropriate transform for coding, for example, a data transform such as DCT transform. In the present invention, a video coder will be explained as one field of the application.

Figure 5:
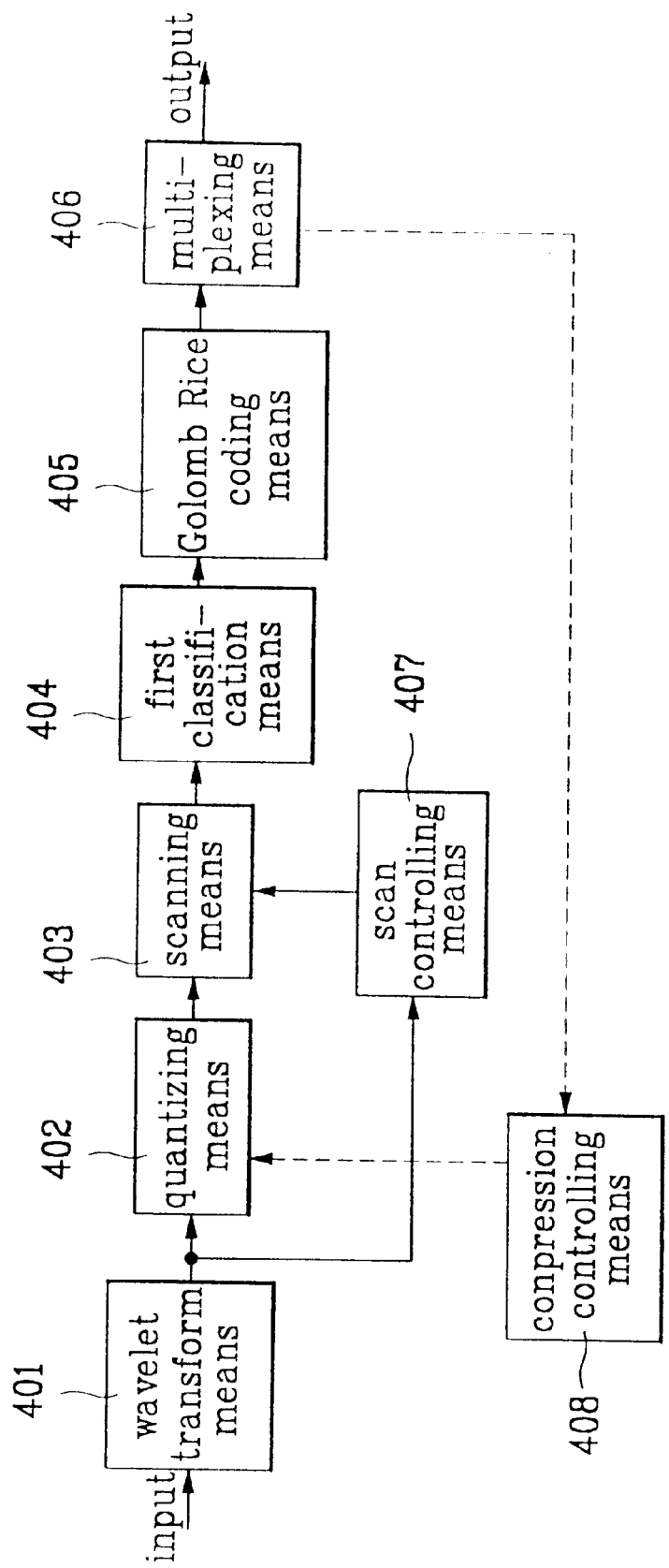
FIG. 5 illustrates a block diagram of one embodiment in which the present invention is applied to a video coder; and, FIG. 6 illustrates a block diagram of one embodiment of a lossless coder of the present invention applied to FIG. 5.

FIG. 5 illustrates one example of a case in which the present invention is applied to a video compression coder. However, the lossless coding method and device of the present invention is not limited to this.

Referring to FIG. 5, the video coder having the present invention applied thereto includes wavelet transform means 401 for subjecting al input video signal to wavelet transform, quantizing means 402 for quantizing a signal from the wavelet transform means 401, scanning means 403 for scanning a sub-band region of the quantized signal, classifying means 404 for comparing the video signal scanned by the scanning means 403 with a threshold value, for classifying and arranging the video signal, Golomb Rice Coding means 405 for subjecting the compared, classified and arranged data group to the Golomb Rice Coding, multiplexing means 406 for multiplexing the video signal subjected to the Golomb Rice Coding, scan controlling means 407 for controlling the scanning means 403 scanning of the sub-band regions, and compression control means 408 for controlling the quantizing means 402 and the multiplexing means 406 for controlling a video compression ratio.

The operation of the video coder will be explained.

The digital video signal is provided to the wavelet transform means 401 and is transformed into frequency information. As shown in FIG. 1, the wavelet transformed video has sub-bands. Then, the wavelet transformed video is provided to the quantizing means 402 and quantized into preset quantizing steps corresponding to the video signal, and, one the same time, is also provided to the scan controlling means 407 for use as information for controlling the scanning means 403. The scanning means 403 conducts an appropriate scanning of the sub-band regions of the video signal from the quantizing means 402. The scanned information, for example, being the input data 301 group shown in FIG. 4, is provided to the classifying means 404. The classifying means 404 compares the input data to a threshold value Th, to provide at least three data groups, i.e., a data group 302 greater than the threshold value, a data group 303 smaller than the threshold value, binary mask 304, positional information, to the Golomb Rice Coding means 405. The Golomb Rice Coding means 405 subjects the at least three data groups to the Golomb Rice Coding. The video signal subjected to the Golomb Rice Coding is multiplexed in the multiplexing means, and, in this instance, a compression ratio is controlled by the compression controlling means 408.

Figure 6:
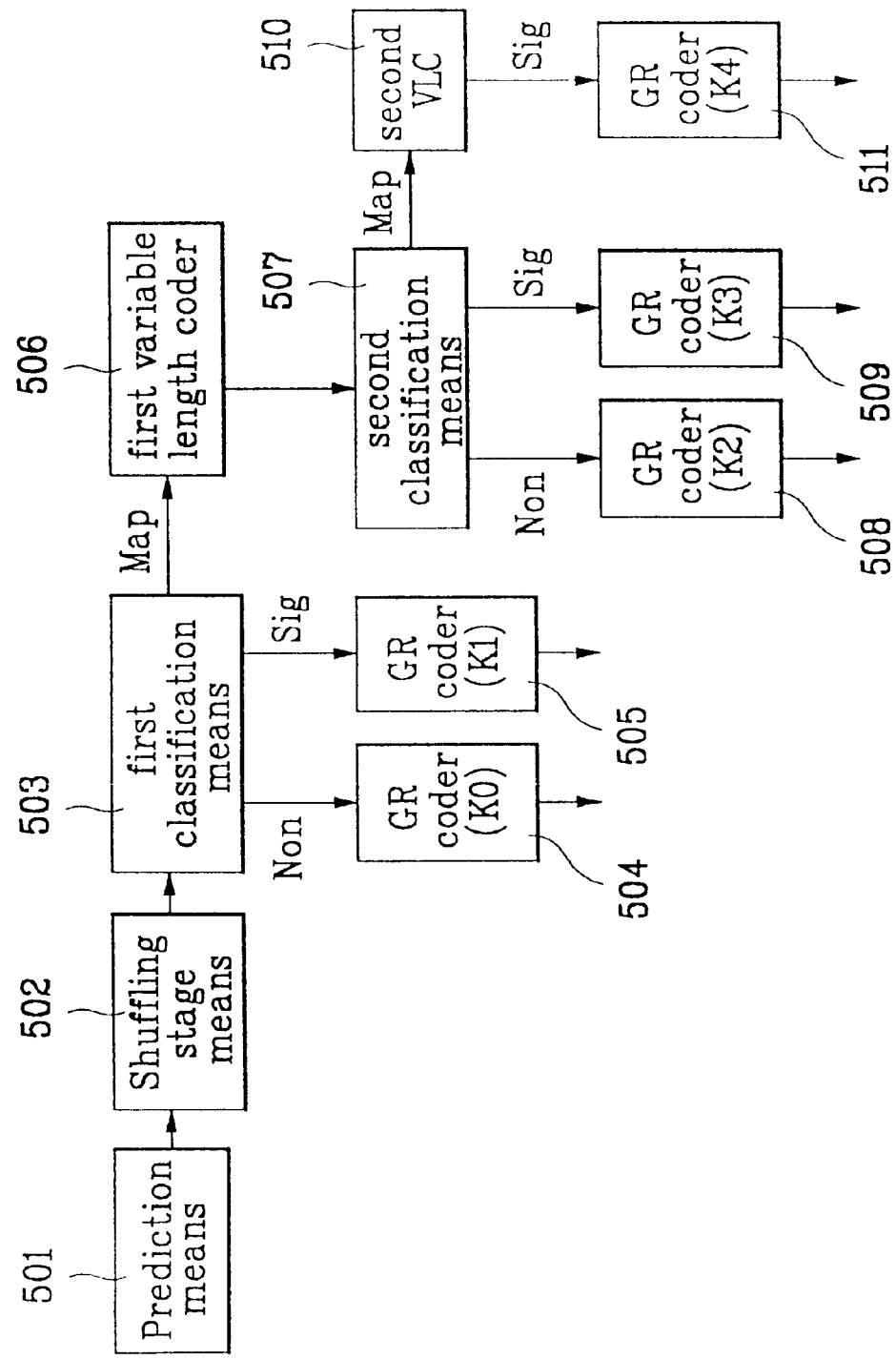

FIG. 6 illustrates a block diagram of another embodiment of a video compression coder having the first classifying means 404, wherein the comparison of the input digital video data to the threshold value is made for two times.

Referring to FIG. 6, the another embodiment video compression coder having the classifying means 404 includes a prediction means 501 for removing correlation between input video pixels, a shuffling stage means 502 for converting the digital video signal from the prediction means 501 into a form suitable for a Golomb Rice Coder, a first classifying means 503 for comparing the video signal processed in the shuffling stage means 502 to a threshold value, for providing values Sig greater than The threshold value, values Non smaller than the critical value, and positional information Map of the values, a first Golomb Rice Coder 504 for subjecting values Non smaller than the threshold value to the Golomb Rice Coding of the data provided from the first classification means 503, a second Golomb Rice Coder 505 for subjecting values Sig greater than the threshold value to the Golomb Rice Coding of the data provided from the first classification means 503, a first VLC 506 for subjecting the positional information Map from the first classification means 503 to VLC, a second classification means 507 for comparing data from the VLC 506 to a threshold value to provide values greater than the threshold value, values smaller than the threshold value, and positional information of the values, a third Golomb Rice Coder 508 for subjecting values Ton smaller than the threshold value to the Golomb Rice Coding of the data provided from the second classification means 507, a fourth Golomb Rice Coder 509 for subjecting values Sig greater than the threshold value to the Golomb Rice Coding of the data provided from the second classification means 507, a second VLC 510 for subjecting the positional information Map from the second classification means 507 to VLC, and a fifth Golomb Rice Coder 511 for subjecting data from the second VLC 510 to the Golomb Rice Coding. The threshold value of the first classification means and the threshold value of the second classification means may or may not be the same, and K parameters of respective Golomb Rice Coders set as K0~K4.

The operation of the coder shown in FIG. 6 will be explained.

The prediction means 501 removes correlation(similarity of information between pixels) between pixels in an input video. The correlation between pixels in the input video is removed because a symbol compression ratio can be improved only when the quartization is conducted under a state the correlation is removed to the maximum. Alikely, an efficiency of an entropy coding by an entropy coder in the VLC at an end of the prediction means 501 can be improved only when the correlation is removed to the maximum. The digital video signal(data) from the prediction means 501 is arranged into an appropriate form in the shuffling stage means 502(a Laplace distribution is transformed into a non-negative exponential distributor, a form suitable for the Golomb Rice Coder), and provided to the first classification means 503. As shown in FIGS. 3 and 4, the first classification means 503 compares the input digital video signal to a preset threshold value, to provide values greater than the threshold value, values smaller than the threshold value, and positional information on the values. The values smaller than the threshold value from the first classification means 503 is provided to the first Golomb Rice Coder 504 and subjected to the Golomb Rice Coding, and the values greater than the threshold value from the first classification means 503 is provided to the second Golomb Rice Coder 505 and subjected to the Golomb Rice Coding. And, respective positional information on data classified at the first stage from the first classification means 503 is subjected to VLC in the first VLC 506. The positional information subjected to VLC thus may be subjected to the Golomb Rice Coding directly, or may be compared to a threshold value, and classified again in the second classification means 507 for providing a better performance(for the Golomb Rice Coding). In FIG. 6, it is shown that the second classification means 507 compares the positional information subjected to VLC in a front stage to a threshold value, to provide another different two data groups as a result of the comparison. That is, the positional information subjected to VLC in the front stage is compared to the threshold value in the second classification means 507, to provide values smaller than the threshold value which are subjected to the Golomb Rice Coding in the third Golomb Rice Coder 508, values greater than the threshold value which are subjected to the Golomb Rice Coding in the fourth Golomb Rice Coder 508, and positional information which is subjected to VLC in the VLC 510 and subjected to the Golomb Rice Coding in the fifth Golomb Rice Coder 511 Such a series of processing steps may be repeated until the video signal is suitable for application of the Golomb Rice Coding.

Thus, by applying the Golomb Rice Coding to all final results after the input video signal is classified suitable for the Golomb Rice Coding, a compression performance can be improved and a number of bits can be saved while complexity is reduced. In the present invention, with reference to a threshold value, the input symbols are sorted into values greater than the threshold value, values smaller than the threshold value, and produces binary mask values which indicate position values of the sorted data for processing the input symbols suitable to apply the Golomb Rice Coding thereto. Particularly, by preceding a data processing that makes the data suitable for subjecting to the Golomb Rice Coding in compression coding a video signal, the present invention can embody a video signal compression coder utilizing merits of the Golomb Rice Coder, i.e., simple and easy to coding and decoding. And, in a case when the input symbols are sorted with reference to a threshold value into values greater than the threshold value, values smaller than the threshold value, and positional information, and transmits at least three sorts of information, the present invention can reproduce an original image. And, by coding the information by means of the Golomb Rice Coding, an efficient, but simple compression can be implemented. And, because the digital data compression coding of the present invention is applicable to one dimensional data as well as two dimensional data, and, particularly, irrespective of method of transform, such as DCT or wavelet the digital data subjected, or variety of the data to be compressed, an efficient compression coder can be embodied.

It will be apparent to those skilled in the art that various modifications and variations can be made in the method and device for compressing and encoding a digital data of the present invention without departing from the spirit or scope of the invention. Thus, it is intended that the present invention cover the modifications and variations of this invention provided they come within the scope of the appended claims and their equivalents.

What is claimed is:

1. A lossless coding method, comprising the steps of:
   (1) comparing input data with a threshold value, to classify data greater than the threshold value, data smaller than the threshold value, and, positional information on the data; and,
   (2) coding the data greater than the threshold value, and the data smaller than the threshold value, by using Golomb Rice Coding, and coding the positional information subjected to VLC (Variable Length Coding) by using Golomb Rice Coding.

2. A method as claimed in claim 1, wherein a process is repeated for a predetermined number of times, in which the positional information subjected to the VLC is compared to the threshold value again, to classify the data into greater values and smaller values and to obtain the positional information of the values, subjecting the greater values and the smaller values to the Golomb Rice Coding, and subjecting the positional information to the VLC, and finally subjecting the positional information subjected to the VLC is to the Golomb Rice Coding.

3. A method as claimed in claim 1, wherein a process is repeated as required, in which the values greater than the threshold value, the values smaller than the threshold value, and the positional information, or at least any one thereof are compared to the threshold value individually again, to classify data and obtain positional information on the data, for coding the data.

4. A method as claimed in claim 1, wherein the input data is biased if the input data is greater than the threshold value before the input data is arranged, and the input data is arranged as it is, if the input data is smaller than the threshold value.

5. A method as claimed in claim 1, wherein the input data is a one dimensional data.

6. A method as claimed in claim 1, wherein the input data is a two dimensional data.

7. A method as claimed in claim 1, wherein the input data is a data subjected to data transform.

8. A video compression coding device comprising:
   transform means for transforming a video signal into frequency information;
   classifying means for comparing the video signal transformed into frequency information to a threshold value, to classify the video signal into values greater than the threshold value, values smaller than the threshold value, and positional information representing positions of the respective classified values in the input video signal;
   means for subjecting the values greater than the threshold value and values smaller than the threshold value to the Golomb Rice Coding among the values from the classifying means;
   means for subjecting the positional information to VLC (Variable Length Coding) among values from the classifying means; and
   means for repeating a process for a predetermined number of times, in which the positional information subjected to the VLC is compared to the threshold value again, to classify into the greater values and the smaller values and to obtain the positional information of the values, subjecting the greater values and the smaller values to the Golomb Rice Coding, and subjecting the positional information to the VLC, and finally subjecting the positional information subjected to the VLC to the Golomb Rice Coding.

9. A device as claimed in claim 8, wherein the transform means subjects the video signal to a wavelet transform, thus transforming the video signal into said frequency information.

10. A device as claimed in claim 8, wherein the transform means subjects the video signal to a DCT (Discrete Cosine Transform), thus transforming the video signal into said frequency information.

11. A video compression coding device comprising:
   a prediction means for removing correlation between input video pixels;
   a shuffling stage means for converting a digital video signal from the prediction means into a form suitable for a Golomb Rice Coding;
   a first classifying means for comparing the video signal processed in the shuffling stage means to a threshold value, for providing values greater than the threshold value, values smaller than the critical value, and obtaining positional information of the values;
   a Golomb Rice Coder for subjecting the values greater than the threshold value and the values smaller than the threshold value to the Golomb Rice Coding among the data provided from the first classification means;
   a first VLC (Variable Length Coder), for subjecting the positional information from the first classification means to Variable Length Coding;

a second classification means for comparing data from the first VLC to a threshold value to provide values greater than the threshold value and values smaller than the threshold value, and obtaining positional information of the values;

a Golomb Rice Coder for subjecting the values greater than the threshold value and the values smaller than the threshold value to the Golomb Rice Coding among the data provided from the second classification means;

a second VLC (Variable Length Coder) for subjecting the positional information from the second classification means to the Variable Length Coding; and a Golomb Rice Coder for subjecting data from the second VLC to the Golomb Rice Coding.

12. A device as claimed in claim 11, wherein the shuffling stage means transforms a Laplace distribution of the digital video signal from the prediction means into an exponential distribution.

13. A device as claimed in claim 11, wherein the threshold values for the first and second classification means may, or may not be the same.

* * * * *